Oct. 24, 1967     J. POSTOLOWSKI     3,348,431
INDEXING APPARATUS
Filed Oct. 28, 1965                                                            3 Sheets-Sheet 1
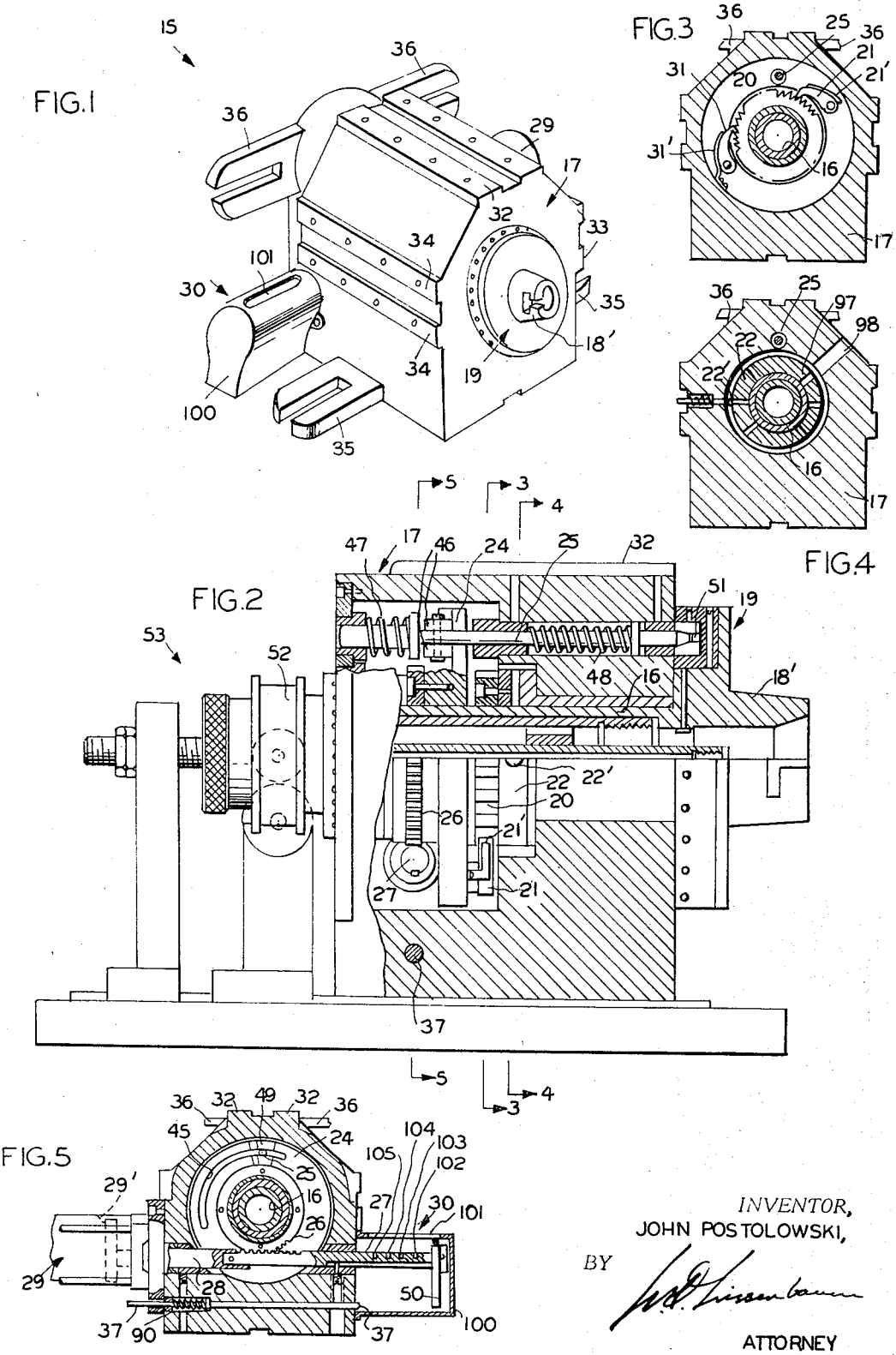
INVENTOR,
JOHN POSTOLOWSKI,
BY
ATTORNEY Oct. 24, 1967    J. POSTOLOWSKI    3,348,431
INDEXING APPARATUS
Filed Oct. 28, 1965    3 Sheets-Sheet 2
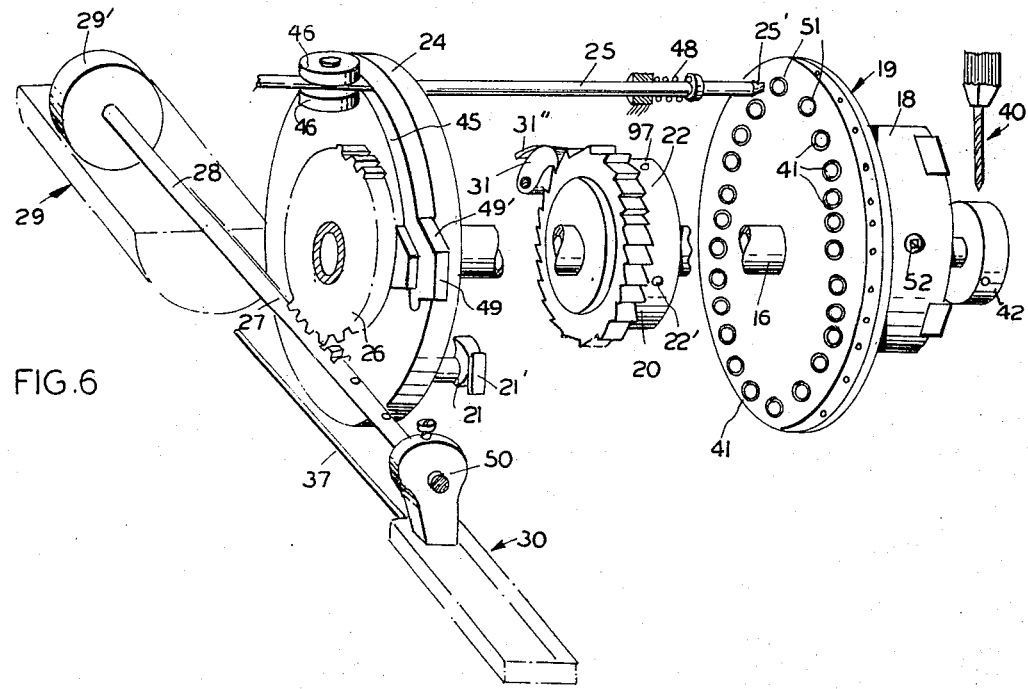
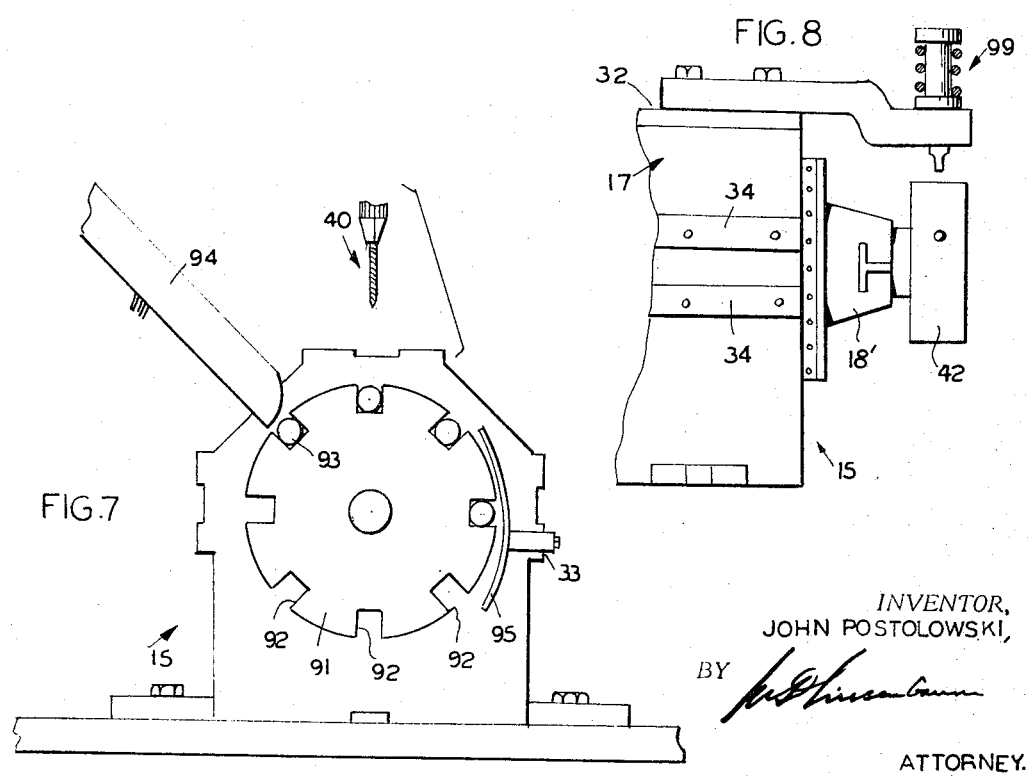
INVENTOR,
JOHN POSTOLOWSKI,
BY
ATTORNEY.

United States Patent Office

3,348,431
Patented Oct. 24, 1967

3,348,431
INDEXING APPARATUS
John Postolowski, 45—12 163rd St.,
Flushing, N.Y. 11358
Filed Oct. 28, 1965, Ser. No. 506,021
16 Claims. (Cl. 74—822)

The present invention relates to indexing apparatus in which a rotatable shaft is intermittantly moved equal parts of a revolution, and hence is adaptable that during rest periods in the step-by-step motion, various operations as for instance, drilling, punching or milling, may be performed in equi-spaced angularity on a piece of work held in a chuck device on the shaft, or on pieces of work held in equi-spaced angular positions on a plate or table secured on said shaft.

The principal object of this invention is to provide a novel and improved indexing apparatus of the class mentioned, for high precision work, in which indexing is automatic, either for one complete shaft revolution at a time, or continuous. In the employment of this indexing apparatus, machine tool operation may be automatic or manual. Provision is also made to change the number of steps of shaft movement per revolution.

A further object thereof is to provide a novel and improved automatic indexing apparatus of the character described, in which a locking mechanism which holds the shaft fixed during the rest periods includes a slidable locking bolt, for which, spring action is sufficient to shift it into locking position, but its hold on the shaft is so fast, that it requires motive power to release it.

Another object of this invention is to provide an apparatus of this kind, of novel and improved construction, which is mountable in various positions and may have mounted thereon at various locations, jigs, fixtures and work-performing means.

Still a further object thereof, is to provide an apparatus of the character set forth, having the mentioned attributes, and which is simple in construction, reasonable in cost to manufacture, easy to adjust and efficient in carrying out the purposes for which it is designed.

Other objects and advantages will become apparent as this disclosure proceeds.

For one practice of this invention, a journalled shaft to be turned step-by-step, terminates in a work-holding device at one end, and said shaft carries rotatably mounted thereon, a cam for locking the shaft by a slidable bolt and for its release and a gear which is in meshed engagement with a rack which is an extension of the piston rod of a double-acting pneumatic cylinder provided with means to adjust its stroke. Said shaft also carries fixed thereon an index wheel with equi-spaced sockets to be engaged by said slidable bolt, a ratchet wheel to be operated by a pawl travelling with said cam, and also a cam to operate a cut-off switch at the completion of each revolution of said shaft. Said bolt is spring-biased to locking position and is retracted by its said control cam. A circuit for operating the cylinder includes a switch controlled by piston movement and another controlled by machine tool operation. The above contemplates that the machine tool is manually operated to the work and away therefrom; indexing, of course being automatic, and stops when the shaft has made one revolution. For automatic operation of the machine tool, the circuit includes another switch operated by piston movement to advance the tool into the work, and a switch controlled by said machine tool operation, to retract the tool. For continuous indexing, the cut-off switch is inactive and there is provision for continuous feeding of pieces to be machined.

The frame for this indexing apparatus is preferably a casing through which the shaft is positioned and extends therefrom where it carries the work-holding device. Most of the other components on the shaft, are interior said casing. The pneumatic cylinder and the means to regulate its piston stroke are outside. Lugs extending from said casing allow it to be mounted so the shaft is selectively either horizontal or vertical. Seats are provided along the top and side walls of said casing, for mounting various appurtenances, as jigs, fixtures or working tool means. Switches controlled by piston and shaft movements are mounted on the casing and cylinder.

In the accompanying drawings forming part of this specification, similar characters of reference indicate corresponding parts in all the views.

FIG. 1 is a perspective view of an automatic indexing apparatus embodying the teachings of this invention.

FIG. 2 is an enlarged central longitudinal section of FIG. 1, modified in respect to its work-holding mechanism only.

FIG. 3 is a section taken at line 3—3 in FIG. 2, which includes the shaft, its locking bolt, the ratchet wheel and the pawls associated therewith.

FIG. 4 is a section taken at line 4—4 in FIG. 2, which includes the cut-off switch and its operating cam.

FIG. 5 is a section taken at line 5—5 in FIG. 2, which includes the gear carried by the shaft, its pneumatic cylinder driving means and its associated mechanism to adjust the stroke of said piston.

FIGS. 3–5 are drawn to a reduced scale.

FIG. 6 is an "exploded" perspective view of the indexing mechanism, with a piece of work being machined, mounted in its chuck. The drill for doing the work, is also indicated. Some parts are shown in section.

FIG. 7 is a front view of the indexing apparatus equipped for continuous indexing.

FIG. 8 is a fragmentary side view of FIG. 1, having the work-holding means of FIG. 2, presenting a piece of work to a hole punch mounted on the casing; said punch to be operated by a reciprocating ram not shown.

Figure 9:
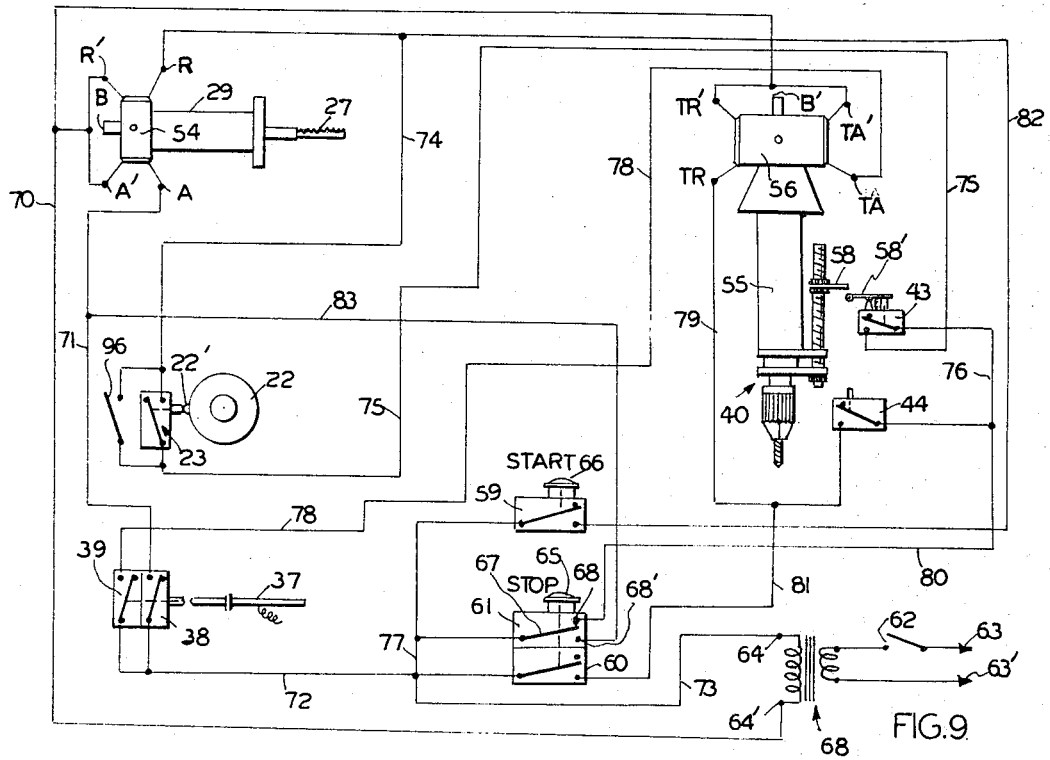

FIG. 9 shows a circuit diagram of one system which may be employed for fully automatic operation of the indexing apparatus and of the machine tool, wherein all operation ceases upon completion of one piece of work; the cut-off switch having been opened by its operating cam which is carried on the shaft. This diagram will also be used to show continuous fully automatic operation as would be required for the set-up illustrated in FIG. 7.

Figure 10:
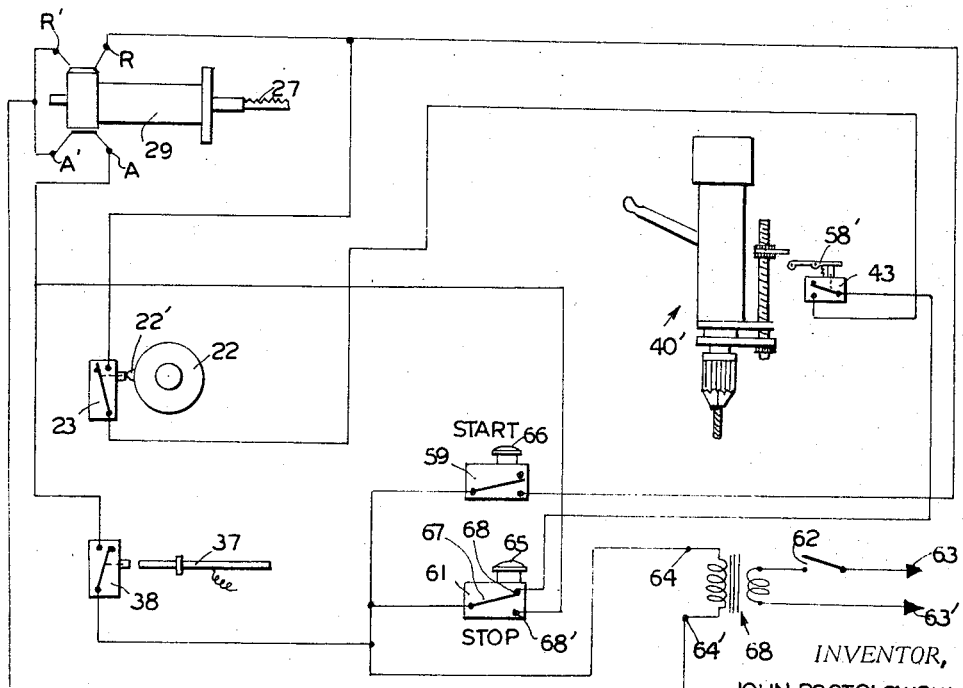

FIG. 10 shows a circuit diagram of one system which may be used for fully automatic indexing where the machine tool operation is manual.

In the drawings, the indexing apparatus designated generally by the numeral 15, has the shaft 16 which is to be turned step-by-step, extending through a casing denoted generally by the numeral 17 which serves as the frame on which said shaft is journalled for rotation, and extends therefrom, terminating in a chuck device 18, or other work-holding means at its exterior end. This shaft carries fixed thereon, an index wheel indicated generally as 19, which is here shown exterior said casing, a ratchet wheel 20, and a cam 22 to operate a cut-off switch 23 upon the completion of each revolution of said shaft. This shaft carries rotatable thereon, a plate cam designated generally by the numeral 24, for operating a slidably mounted bolt 25 positioned parallel to said shaft 16, and a gear 26 which is in meshed engagement with a rack 27 which is an extension of the piston rod 28, of a double-acting pneumatic cylinder 29, provided with a means indicated generally by the numeral 30, to adjust the length of the piston stroke. A pawl 21, engaging said ratchet 20, is carried on a support from the cam plate 24. A holding pawl 31 carried on the frame, also engages said ratchet. Said slidable bolt 25 is within said casing 17, but has one of its ends extending therefrom when in engagement with said index wheel 19. The gear 26, the cams 24 and 22, and the ratchet 20 are inside said casing. Said gear 26 is secured onto a face of said plate cam 24. Said casing is provided with seats 32, 33 and 34, adaptable for attachment of various appurtenances thereon, and the lugs 35 and 36, to selectively mount the casing so the shaft is either horizontal or vertical. Movement of the piston of the pneumatic cylinder 29, controls a slidable rod 37 which operates a switch 38, and when necessary, also a switch 39. Movement of the machine tool 40 which is to perform on the work piece 42 held in the chuck 18, controls the operation of a switch 43, and when necessary, also a switch 44. The switches 23, 38 and 39 are mounted on the casing 17. The switches 43 and 44 are mounted on the machine tool 40. The number of sockets 41 in the index wheel 19 for engagement by the locking bolt 25, the number of teeth in the gear 26, and the number of teeth in the ratchet 20, are here equal; a practical number being twenty-four, so the number of steps per revolution of the shaft 16, may be adjusted to be three, four, six, eight, twelve and twenty-four. Another practical number would be thirty, so the number of steps per revolution of the shaft 16, can be made to be three, five, six, ten, fifteen and thirty.

The index wheel 19 has its sockets 41, arranged equi-spaced around a circle which is concentric with the axis of the shaft 16, and such wheel is positioned on said shaft so that the locking bolt 25 can enter one of said sockets at a halt position of said ratchet 22. The plate cam 24 has an arcuate slot 45 through which said locking bolt 25 slidably fits. A follower comprising the companion rollers 46 at the other end of said bolt, contact the face of said plate cam 24, whereupon said bolt is out of engagement with the index wheel 19, towards which it is biased by springs 47, 48. A depression 49 in that face of the plate cam 24, which is adjacent said follower, allows the latter to be drawn therein when aligned therewith, whereupon the index wheel 19, and hence the shaft 16 is securely locked against rotation by the bolt 25. The piston-stroke adjustment means 30, is offered by a stop member 50, which is slidable on the rack 27, and releasably securable at prescribed positions therealong, determining the number of teeth the gear 26 will be moved by the permitted piston stroke. It is this member 50 which shifts the spring biased rod 37, to operate the switch 38.

Of importance to note, is that to assure secure locking of the index plate 19 at its indexing positions, the end 25' of the locking bolt 25 is tapered and precisely fits into a matching socket 41 which is offered by a bushing 51 in each instance. These mating tapers shall be self-holding and so for such purpose they are designed as a standard Morse taper preferably, which is well known in engineering. The springs 47 and 48 are sufficient to shift the bolt 25 into locking position in the socket it is made to enter by said springs when the cam followers 46 enter into the depression 49 in the cam plate 24, but the wedge-action hold on the locking bolt requires motive power to undo before it can be retracted. Hence, the pneumatic cylinder 29 is utilized to turn the cam plate 24 to withdraw the locking bolt.

The holding device to mount the work piece 42 may be an ordinary three-jaw chuck 18 of the type made to open and close by manually turning a key set into the socket 52, or the indexing device may be built-in with well known quick-locking chuck devices operated by moving a quick-locking sleeve 52 which offers the tapered nose 18' at the end of a hollow spindle 16' which in such case would be the shaft of the indexing device which carries the parts 22, 20, 24 and 26 as shown in FIG. 2. The details of structure of such quick-acting chucking device indicated generally by the numeral 53, being well known in the machine art, further description thereof is believed unnecessary, since no claim is made herein therefor.

The FIGS. 2, 3 and 5 show the condition of the apparatus 15 when not in operation, that is when a piece of work 42 is to be mounted on the chuck, ready to have machining done thereon, or when the operations on a piece of work have been completed and the apparatus stops absolutely. This is also the condition when the machining tool 40 is being advanced into the work while the workpiece is at rest at the completion of a shift of the indexing wheel 19, because of a movement of the shaft 16'. Here, the piston 29' is in its advanced position, that is, its piston rod 28 is in its outward position, and the indexing wheel is locked by the bolt 25 and hence the shaft is locked. FIG. 6 shows the condition of the apparatus when the piston 29' is retracted, that is its piston rod 28 has moved into the cylinder. Here, the bolt 25 is withdrawn from the indexing wheel 19, and so the shaft 16' is free to be turned.

Examples of various systems for operating the apparatus will now be described, for which reference will be had to the FIGS. 9 and 10, each of which show the apparatus in rest condition.

FIG. 9 shows one system to accomplish automatic indexing, automatic operation of the machine tool 40, with automatic stop when a piece of work is completed. The number of equal shifts to be made by the shaft 16' per revolution, is determined by the initial setting of the stop member 50 on the rack rod 27, and indexing is effected by the operation of the pneumatic cylinder 29 which is controlled by a two-solenoid operated valve 54. The machine tool 40 is advanced into the work piece 42 and retracted therefrom by operation of a double-acting pneumatic cylinder 55, which is controlled by a similar valve means 56. The automatic stop is effected by the stop button 22' forming the hump of the cam 22, when it causes the normally closed micro-switch 23, to open. Said solenoid-operated valves 54 and 56 are well known in the machine art, so it is sufficient to mention that when current is applied to the terminals R, R' of one of the solenoids of the valve 54, the compressed air supply entered at B will be directed to retract the piston 29', and when current is applied to the terminals A, A' of the other solenoid of said valve 54, said compressed air supply will be directed to advance the piston 29. Likewise, when current is applied to the terminals TA and TA' of one of the solenoids of the valve 56, the compressed air supply entered at B' will be directed to advance the tool 40 into the work, and when current is applied to the terminals TR and TR' of the other solenoid of the valve 56, the compressed air supply from B' will be directed to retract the tool. Here, 40 is a drill press which is running while the apparatus 15 is being used. Said valve means 54 and 56 operate in such fashion that when air is directed into one end of a cylinder, the other end is automatically connected to the atmosphere.

A number of normally open micro-switches are employed in this system, and so associated therein so that the operation of the cylinder 29 to accomplish indexing, and the operation of the cylinder 55 to advance and retract the operating machine tool, are done in proper timed relation. The advance of the piston 29' is controlled by the switch 38 which is operated by the rod 37. The retraction of said piston is controlled by the switch 43, upon retraction of the tool 40, causing an element 58 to intercept and move the spring-biased operating element 58' to close said switch 43 momentarily upon upward movement of the drill press spindle, and though such element 58 trips such operating element when the drill descends, it has no effect on said switch 43. The advance of said tool 40 is controlled by the switch 39 which is operated by the rod 37. The switches 38 and 39 being operated together, may constitute a double-pole, double-throw switch in aggregate. The retraction of the tool 40 is controlled by the switch 44 which is operated by said element 58 upon completion of the advance stroke of said tool. A switch 59 is for starting the apparatus by pressing on the button 66, after a piece of work to be machined, has been mounted in the chuck device.

As a safety means, it is advisable to include the switch 60, which is a normally open micro-switch to retract the tool 40, when operated to close by pressing the button 65, and the single-pole, double-throw micro-switch 61, for use to advance the piston 29, so as to bring the apparatus back into locked position. The pole 67 of said switch 61, is normally in contact with terminal contact 68, and when the button 65 is pressed, said pole 67 leaves contact 68 and makes contact with the terminal contact 68'. Of course, to stop the apparatus in any condition it may be at any particularly moment, the switch 62 interposed in one of the main power lines 63, 63' may be opened. The output terminals 64, 64' of the secondary winding of a step-down transformer 68, furnish the power for the operation of the solenoids of the valve means 54 and 56.

One terminal of each of the four solenoids of the valve means 54 and 56, namely those indicated as A', R', of the valve means 54, and TA', TR' of the valve means 56, are connected to a conductor 70 leading to the output power terminal 64' of the transformer 68. It is evident that to energize any of the solenoids, the other terminal thereof must be connected to the output terminal 64 of the transformer. Such paths will now be traced.

The path from terminal A to terminal 64, proceeds through conductor 71, through switch 38, through conductors 72 and 73 to the terminal 64. The path from terminal R to terminal 64, proceeds through the conductor 74, through the switch 23, through the conductor 75, through the switch 43, then through the conductors 76, 80 to the terminal 68, through the pole 67 of switch 61, then through the conductors 77 and 73, to the terminal 64. The path of current from the terminal TA to terminal 64, proceeds through the conductor 78, through the switch 39, then through the conductors 72 and 73, to the terminal 64. The path from terminal TR to the terminal 64, proceeds through the conductor 79, through the switch 44, through the conductor 80 to the terminal 68, then through the pole 67, and then through the conductors 77, 73 to the terminal 64. Another path from the terminal TR to the terminal 64, proceeds through the switch 60 by way of the conductor 81, then through the conductor 73 to the terminal 64. Another path from the terminal R to the terminal 64, proceeds by way of conductor 82, through the switch 59, then through the conductors 77 and 73 to the terminal 64. Another path from the terminal A to the terminal 64, proceeds by way of the conductor 83 to switch point 68', through the pole 67, thence through the conductors 77, 73 to the terminal 64.

At rest condition of the apparatus 15, which is shown in FIGS. 2–5, the condition of the circuit is as shown in FIG. 9. The piston 29' is in advanced position, that is, its piston rod 28 is out of the cylinder 29. The locking bolt 25 is engaged in a socket 41 of the indexing wheel 19. The cam followers 46 are of course within the depression 49 of the cam plate 24. The switch 23 is held open by the button 22' of the cam 22. The pole 67 of the switch 61 is in contact with the terminal 68. All other micro-switches are in open condition.

The work to be done, for example, is to drill four equi-spaced holes around the periphery of a work piece 42. The stop member 50, is set releasably fixed on the rod 27 as shown in FIG. 5, at such position that upon retraction of the piston 29', its permitted movement will case the rack 27 to turn the 24-toothed gear 26, six teeth.

To operate the apparatus 15, the operator closes the switch 62 in the main power lines, and connects a constant supply of compressed air to the intakes B and B'. Then he mounts a piece of work 42 into the chuck and locks it thereon in proper position. Then he taps the start button 66 to momentarily close the switch 59, which causes current to be applied to the retract terminals R and R', and so the following take place immediately:

Piston rod 28 retracts into the cylinder 29, and the member 50 is moving towards the rod 37. The rack 27 will cause the gear 26 and the cam plate 24 to turn clockwise a quarter of a revolution. The cam followers 46 will move along the incline 49' and out of the depression 49 and thus the locking bolt 25 will withdraw from the indexing plate 19. The ratchet pawl 21 will "pick up" six teeth on the ratchet wheel 20. The member 50 will push the spring-biased rod 37, to close the switches 38 and 39. The following take place immediately: Current is immediately supplied to the terminals A and A' upon the closing of the switch 38, and to the terminals TA and TA' upon the closing of the switch 39. The piston rod 28 will advance out of the cylinder 29. The drilling unit 40 will advance towards the work 42. The following will take place immediately: The ratchet pawl 21 is already engaged into a tooth of the ratchet wheel 20. As the piston rod 28 is advancing, said ratchet wheel is turned counterclockwise one quarter of a revolution and so the shaft 16' and all it has secured thereto will turn with it to the next index, including the work piece 42. As the piston rod 28 continues to advance, the cam followers 46 ride on the surface of the cam plate 24 and finally enter the depression 49 therein by action of the tensed compression springs 47, 48, causing the locking bolt 25 to lock into a socket 41 at its position in the indexing plate 19. Upon the movement of the shaft, the button 22' did move away, whereupon the switch 23 did assume its normal closed condition and will stay closed until the shaft has completed one revolution, which automatically prevents the piston rod 28 from retracting, so said rod 28 is left in advance position with the locking bolt 25 in locking position as in FIGS. 2 and 5. Also during the advance of the piston rod 28, the member 50 has moved away from the rod 37, and such rod by action of the stressed spring 90, did move away and so the switches 38 and 39, did open.

As the drilling unit 40 is advancing towards the work piece 42, the extending element 58 moving with such unit, merely trips the spring-biased member 58', but does not close the switch 43. When the tool 40 completes its work by drilling a hole 42', the element 58 is in position whereby it causes the switch 44 to close. Current is thus supplied to the retract terminals TR and TR'. As the spindle of the drilling unit 40 is retracting, meaning it is ascending, the element 58 intercepts the element 58' which momentarily closes the switch 43 and immediately current is supplied to the terminals R and R' since switch 23 is in closed condition. This event is readily recognized as the equivalent of what happened when at the start, the switch 59 was closed. It is evident that the cycle of operation described will now automatically repeat itself until the shaft has made one complete revolution, whereupon the button 22' will again open the switch 23, making retraction of the piston rod 28 impossible though the switch 43 is momentarily closed by the retraction of the tool 40 which is returning from its last operation. The apparatus 15, at the completion of all the work to be done on one piece of work, is as shown in FIGS. 2–5. Now the worker removes the finished piece, reloads the chuck with another piece to be worked on, and repeats the whole operation therefore by again tapping on the start button 66.

After commencement of operation, should the apparatus 15 be required to be stopped, because the cutting tool breaks, or the piece worked on is found defective, or because of any emergency or other reason, the button 65 is pressed, whereupon switch 60 is closed to apply current to the terminals TR and TR' so the tool 40 will retract. Pressing said button also moves the pole 67 of the switch 61, away from terminal 68 thereby opening the retract side of the valve means 54, and said pole comes into contact with the terminal 68', thereby applying current to the terminals A and A', causing the piston rod 28 of the cylinder 29 to advance and thus bring the apparatus 15 into locked condition as shown in FIGS. 2 and 5. The entire system is now at rest condition. Since some movement of the apparatus will have caused the button 22' to have moved away and the switch 23 is closed at the time the emergency stop button 65 is pressed, it is necessary to work the apparatus without doing any work on a work-piece, to make the shaft 16, complete the revolution, to bring the button 22' again into position to open the switch 23. This is done by pressing the start button after the cause for the emergency stoppage has been removed. The apparatus 15 and the machining tool 40 will run idle to complete the revolution of the shaft, which was interrupted, and all operation will automatically stop upon the opening of said switch 23, whereupon the apparatus will be again at start condition shown in FIGS. 2–5 and 9, ready to be employed.

Another use of the apparatus 15 is shown in FIG. 7, where instead of a chuck for a single piece of work to have a machining operation performed thereon at each indexing position as specifically utilized in FIG. 6, the chuck is replaced by a wheel 91 having equi-spaced sockets 92 around its periphery which receive a work-piece 93, when in alignment with a chute 94, have work done thereon when at the position to be met by the machining tool 40, and then discharged at the end of the fixed guard 95. This operation continues as long as the chute is fed a supply of work pieces and is fully automatic, by having continuous indexing, which the system shown in FIG. 9 accomplishes by elimination of the switch 23 and of course, the cam 22 becomes unnecessary. One way to have no action by the switch 23, and maintain the circuit including R, R', is to shunt said switch 23 by closing the switch 96 which is across the terminals of said switch 23.

When the system is such that the machining tool is to be hand operated, as for instance the drill press 40', to perform the work required on the pieces 42, with automatic indexing and automatic stop when the operations on a work piece are completed, the system to accomplish such is shown in FIG. 10, which is all of FIG. 9, omitting those components of FIG. 9 which were for the control of the machining tool 40, that is, omitted from FIG. 10, are the switches 39 and 60 and 44, because also absent are the air cylinder 55 and its control valve 56, and there is no need for the switch 96. The remaining switches retain their stated functions, and it is therefore believed that from the explanation of the manner of their operation already given, the manner of operation of the system of FIG. 10 will be readily understood without further exposition.

Should a work piece require the indexing accomplished by any of the settings of the stop member 50, but no machining operation after a required number of machining operations have been done thereon at successive indexing stations, then provision is made to set up the apparatus to stop when the required number of machinings have been done, by mounting an additional stop button like 22' in a suitably angularly spaced hole, of the series marked 97. When the apparatus is stopped because of the presence of such second stop button on the cam 22, the work piece is removed, then the start button 66 is pressed so the apparatus will run idle until the first button 22' is reached, which sets the apparatus at start condition, whereupon a new piece of work is mounted, and such manner of operation continued for the run of the remainder of pieces to be so machined. Such auxiliary stop buttons can be inserted and removed through the passage hole 98.

FIG. 8 shows an example of mounting a machining tool, a punch 99, directly onto the casing 17, which is to be operated by hand or by power, by means not shown, but well known to those versed in the art. The casing 100 may have a lengthwise opening 101, to have access for moving and setting the stop member 50 at its required position on the rod 27, to obtain the required indexing. In its position shown in FIG. 5, the shaft 16 will have four equal shifts per revolution. When said member 50 is set at position 102, the shaft will have six equal shifts per revolution; when at 103, eight; when at 104, twelve, and when at 105, twenty-four.

Although I have indicated in the specifically illustrated embodiment that the number of teeth in the gear 26, and in the ratchet wheel 20, are each equal in number to the sockets 41, the general rule is that the number of teeth in the ratchet wheel shall equal the number of sockets, multiplied by a whole number, and that the length of stroke of the piston rod 28 shall be such that the fractional turn imparted to be the plate cam 24 regardless of the mechanism used to translate the piston rod straight line movement to rotary movement of said plate cam, shall be equal to the angular distance between sockets, multiplied by a predetermined whole number.

The present invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description and showings herein to indicate the scope of this invention.

I claim:

1. In an indexing apparatus of the character described, the combination of a frame, a shaft journalled thereon, a first cam mounted for rotation on the shaft, an index wheel and a ratchet wheel, both fixed on said shaft, a pawl carried on the first cam, biased into engagement with said ratchet wheel so that upon turning the first cam in a first direction, said ratchet wheel will turn in said first direction and upon turning the first cam in the opposite direction, said pawl will ride on the teeth of the ratchet wheel and said ratchet wheel will remain motionless, an elongated bolt positioned in a direction along the shaft, slidably mounted on the frame; said index wheel having a series of identical sockets equi-spaced around an entire circle which is concentric with said shaft; said bolt being entered into one of the socket and the end of the bolt within said socket being fitted therein whereby said shaft is held against turning on the frame, a cam follower carried by said bolt, contacting said first cam; said first cam being adapted when turned in said opposite direction, to shift the bolt out of said socket and free the shaft for rotation on the frame, first means associated with the bolt to move it into a socket when said first cam is turned in said first direction, a pneumatic cylinder having a piston rod, second means associating the piston rod and the first cam whereby on movement of the piston rod in one direction, the first cam will rotate a fraction of a turn in one direction, and on movement of the piston rod in the reverse direction, the first cam will rotate the same fraction of a turn in such reverse direction, an electrically controlled valve for operating said cylinder, a circuit for operating said valve, means to control said circuit, said piston having a predetermined stroke whereby the fractional turn of the ratchet wheel caused upon the fractional turn of the first cam in said first direction, equals the angular distance between sockets multiplied by a predetermined whole number.

2. An indexing apparatus as defined in claim 1, including a second cam fixed on said shaft, and a normally-closed switch interposed in said circuit, which switch when open, makes the circuit inoperative; said switch being controlled by the second cam to open when the shaft is at a predetermined position on the frame.

3. An indexing apparatus as defined in claim 2, including switch means in said circuit for making said circuit again operative after said normally closed switch has been opened.

4. An indexing apparatus as defined in claim 1, including means to change the stroke of the piston of said cylinder.

5. An indexing apparatus as defined in claim 1, wherein the first means is a spring arranged to bias said bolt towards the index wheel.

6. An indexing apparatus as defined in claim 1, wherein the second means comprises a gear free on the shaft for rotary movement and fixed to the first cam to turn therewith, and a rack in engagement with said gear; said rack moving with the piston rod.

7. An indexing apparatus as defined in claim 1, wherein said end of the bolt and each socket are tapered.

8. An indexing apparatus as defined in claim 7, wherein the bolt is tightly fitted in the socket it is entered in, and wherein at least one of the strokes of the piston is effected by pneumatic power; the movement of the first cam in said opposite direction, being effected on the powered stroke of the piston.

9. In an indexing apparatus of the character described, the combination of a frame, a shaft journalled thereon, a plate cam mounted for rotation on said shaft, an index wheel and a ratchet wheel, both fixed on said shaft, a pawl carried by said plate cam, biased into engagement with said ratchet wheel so that upon turning the plate cam in a first direction, said ratchet wheel will turn in said first direction and upon turning of said plate cam in the opposite direction, said pawl will ride on the teeth of said ratchet wheel and said ratchet wheel will remain motionless, an elongated bolt positioned in a direction along the shaft, slidably mounted on the frame; said index wheel having a series of identical sockets equi-spaced around an entire circle which is concentric with said shaft; said bolt having one of its ends entered into one of said sockets and fitted therein whereby said shaft is held against turning on the frame; said plate cam having a depression in that face thereof which is farthest from said index wheel, a cam follower carried by said bolt, contacting said plate cam within said depression whereby on turning said plate cam in said opposite direction, the follower will leave said depression and contact said face of said face cam whereby the bolt will be shifted out of said socket and free said shaft for rotation on the frame, first means associated with the bolt to move it so the follower enters said depression when said follower is out of contact with said face of the plate cam, a pneumatic cylinder having a piston rod, second means associating the piston rod and said cam plate whereby on movement of the piston rod in one direction, the cam plate will rotate a fraction of a revolution in one direction, and movement of the piston rod in the reverse direction, the cam plate will rotate the same fraction of a revolution in the reverse direction, an electrically controlled valve for operating said cylinder, a circuit for operating said valve and means to control said circuit; said piston rod having a predetermined stroke whereby the fractional rotation of the ratchet wheel caused by the fractional rotation of the cam plate in said first direction, equals the angular distance between successive sockets multipled by a predetermined whole number.

10. An indexing apparatus as defined in claim 9, including a second cam fixed on said shaft, and a normally closed switch interposed in said circuit, which switch when open, makes the circuit inoperative; said switch being controlled by the second cam to open when the shaft is at a predetermined position on the frame.

11. An indexing apparatus as defined in claim 10, including switch means in said circuit for making said circuit again operative after said normally-closed switch has been opened.

12. An indexing apparatus as defined in claim 9, including means to change the stroke of the piston in said cylinder.

13. An indexing apparatus as defined in claim 9, wherein the first means is a spring arranged to bias said bolt towards the index wheel.

14. An indexing apparatus as defined in claim 9, wherein the second means comprises a gear free on the shaft for rotary movement and fixed to the cam plate to turn therewith, and a rack in engagement with said gear; said rack moving with the piston rod.

15. An indexing apparatus as defined in claim 9, wherein the said end of the bolt and each socket is tapered.

16. An indexing apparatus as defined in claim 9, wherein the bolt is tightly fitted in the socket it is entered in, and wherein at least one of the strokes of the piston is effected by pneumatic power; the movement of the plate cam in said opposite direction, being effected on the power stroke of the piston.

References Cited

UNITED STATES PATENTS

| | | | |
|---|---|---|---|
| 2,883,886 | 4/1959 | Benjamin | 74—816 X |
| 3,035,461 | 5/1962 | Benjamin et al. | 74—822 |

FRED C. MATTERN, JR., *Primary Examiner.*